Sept. 8, 1936.  E. V. DE PANTHOU ET AL  2,053,815
BOBBIN FOR CINEMA FILMS AND THE LIKE
Filed April 6, 1935
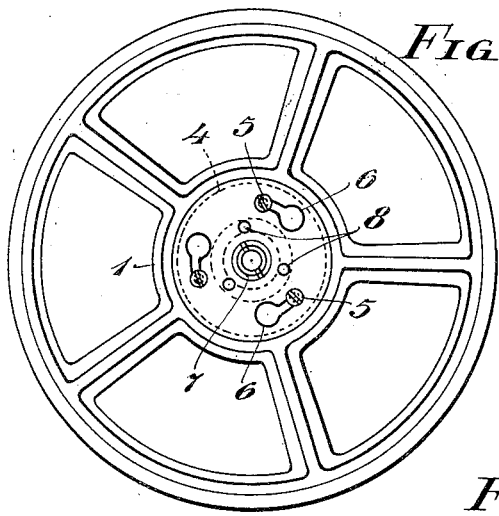
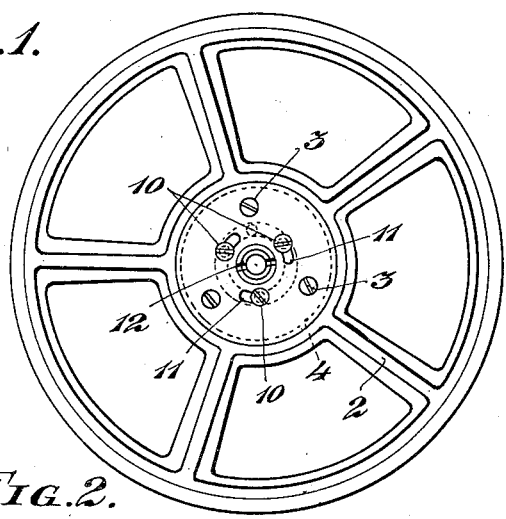
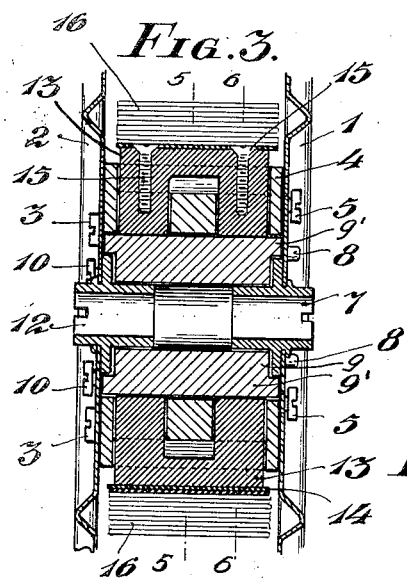
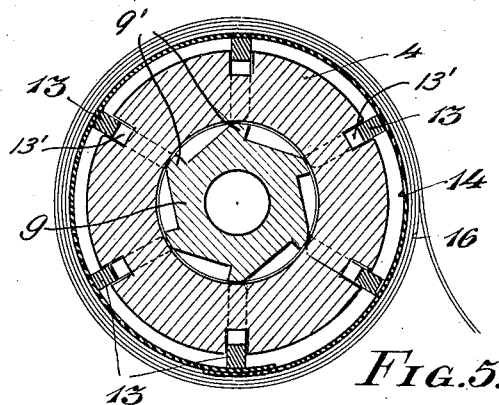
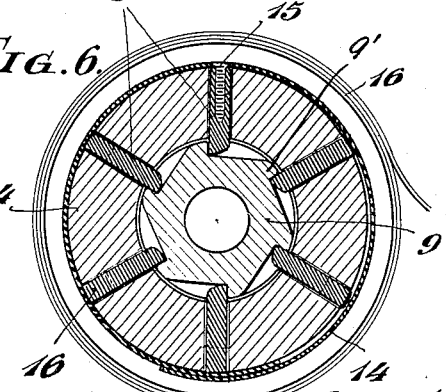
Inventors:
E. V. de Panthou
R. Varela
By: Glascock Downing & Seebold
Attys.

Patented Sept. 8, 1936

2,053,815

UNITED STATES PATENT OFFICE 2,053,815

BOBBIN FOR CINEMA FILMS AND THE LIKE

Esther Varela de Panthou and Raquel Varela, Buenos Aires, Argentina

Application April 6, 1935, Serial No. 15,120

3 Claims. (Cl. 242—72)

This description relates to certain improvements we have introduced in bobbins for cinematographic films, or bands or threads in general.

As is known, in winding bands or films onto ordinary bobbins it happens that such bands or films become too tightly wound around the drum whereby the operation of winding them off the full bobbin is rendered a difficult one.

With the object in mind to avoid this drawback, we have found out certain improvements which allow the size of the drum to be automatically diminished in order that the wound-on material may be readily wound off.

In order that the present invention may be fully understood the same is shown in the accompanying drawing wherein:

Figure 1 shows a cinema-bobbin embodying the improvement in accordance with our invention, Figure 2 shows the same bobbin but seen from the side opposed to that shown in Fig. 1, Figure 3 is an axial section of the bobbin, drawn to a larger scale, Figure 4 shows the toothed drum which is lodged in the centre of the winding-on drum, Figure 5 is a sectional view through line 5—5 of Fig. 3, and Figure 6 is a section through line 6—6 of the said Fig. 3, but with the diameter of the drum being reduced in such a manner that the wound-on material is left completely free.

In the drawing, 1 is the removable disk or wheel of the bobbin and 2 is the wheel which by means of the screws 3 is secured to the drum 4. The drum 4 is provided with screws 5 having enlarged heads and which may be passed through the enlarged perforations 6. By imparting a rotating motion to the wheel 1, the same is secured to the drum, as shown in Fig. 1. The wheel 1, in addition to a boss 7, is provided with perforations intended to receive the fingers 8 secured to the drum 9 having teeth 9'.

When the said wheel 1 of the drum 4 is rotated in order to secure it or free it, the aforementioned fingers and the toothed drum, in conjunction therewith, are moved at an arc the amplitude of which bears relation with the distance between the teeth of the latter.

The said movement is followed by the screws 10 having enlarged heads, which screws, in accordance with the movement of the toothed drum, move in elongated openings 11 on the wheel 2 which is provided with its corresponding boss 12.

The movement of the toothed drum 9 causes each one of its teeth to radially move a bridge-shaped or otherwise formed bar 13 in slots 13' in the drum, the whole of these being encircled by a spring 14 which at its centre portion is retained by the screws 15.

Upon this spring the band or film 16 will be wound.

The operation is as follows:

In order to open the bobbin from its closed position, viz. the one shown in Fig. 1, the wheel 1 is rotated to the left until the heads of the screws 5 arrive in front of the circular enlargement of the openings 6 at which moment the wheel may be removed from the drum.

When this movement takes place the fingers 8 move the toothed drum 9 to such a position that the ends of the bars, due to their remaining at the bottom of the teeth, will permit the spring 14 to tightly close around by its action and reduce the diameter around which the winding-on was started, that is to say, such reduction will take place from the position shown in Fig. 5 and which corresponds with the position of closure (Fig. 1), to the position shown in Fig. 6 and which corresponds with the position of opening or removal of the wheel.

Thus, upon closing the bobbin and beginning with the winding-on, the diameter attained by the spring 14 (Fig. 5) is larger, due to the teeth of the drum 9 causing the bars 13 to radially shoot out, and it is these bars that open the spring. When the movement for separating the wheel 1 is performed, the said toothed drum causes the bars to penetrate into the drum, such bars being impelled by the spring 14 which, as has been said, tends to close around. Under these conditions (Fig. 6), the band or film 16 is left completely free and may be readily drawn out.

What we claim is:

1. In a bobbin for cinematographic films or other strip shaped articles, a drum having longitudinal slots extending therethrough, bars mounted to engage said slots, an elastic sheet with overlapping ends surrounding said drum and secured to one of said bars, said drum having a central bore therein and a toothed cylinder in said bore against the surface of which toothed cylinder the bars are pressed by said elastic sheet, a disk, releasable means securing said disk to said drum, said means being released by rotation of said disk relative to said drum, and means for rotating said toothed cylinder upon rotation of said disk.

2. In a bobbin for cinematographic films or other strip shaped articles, a drum having equally spaced longitudinal slots extending therethrough, a toothed cylinder mounted within said drum, the number of teeth equaling the number of slots, bars extending through said slots and resting on the surface of said toothed cylinder, a contractile elastic sheet encircling said bars secured to one of them and having overlapping ends, and means for rotating said toothed cylinder relative to said drum, whereby the bars and hence the elastic sheet may be forced outwardly or allowed to move inwardly.

3. The device as claimed in claim 2, wherein a disk is secured to each end of the drum, the means for securing one of said disks allowing of limited rotation thereof, and the means for rotating said toothed cylinder relative to said drum comprises a connection between said toothed cylinder and said disk.

ESTHER VARELA DE PANTHOU.
RAQUEL VARELA.